Nov. 11, 1924.

C. CARSON

HEATER VALVE

Filed June 2, 1923

1,515,337

INVENTOR
Clarence Carson
BY
Newell and Spencer.
ATTORNEYS

Patented Nov. 11, 1924.

1,515,337

UNITED STATES PATENT OFFICE.

CLARENCE CARSON, OF DETROIT, MICHIGAN, ASSIGNOR TO DODGE BROTHERS, OF DETROIT, MICHIGAN, A CORPORATION OF MICHIGAN.

HEATER VALVE.

Application filed June 2, 1923. Serial No. 642,949.

*To all whom it may concern:*

Be it known that I, CLARENCE CARSON, a citizen of the United States, residing at Detroit, Michigan, have invented a certain new and useful Improvement in Heater Valves, of which the following is a clear, full, and exact description.

This invention relates to a heater valve, and more particularly to a valve or register to be used in automobiles for controlling the heat or heated air from a heater.

The problem of satisfactorily heating automobiles has become more and more important, due to the extended use of automobiles during the winter months, and to the increasing public demand for conveyances which are heated.

Various devices have heretofore been employed for heating the passenger space of automobiles, but none of the devices have thus far proved entirely satisfactory. The form of heater generally employed for closed cars consists of a pipe extending over the floor board of the passenger space through which the exhaust gases from the engine are passed, causing the pipe to become heated. This heating means has not proved entirely satisfactory, however, for the reason that it may not be regulated to attain the desired amount of heating with changes in temperature. Furthermore, a heater of this type serves only to heat the air in the passenger space, causing a circulation of the stale air therein. The device of the present invention provides not only means for heating, but also for supplying fresh air to the passenger space of the automobile, and overcomes the objectionable features of means heretofore employed, in that the heating may be regulated.

The primary object of the present invention is to provide a heating means for automobiles which is simple in form and which may be readily adjusted to regulate the amount of heat supplied to the passenger-carrying space.

Another object of the invention is to provide heating means which will serve simultaneously for supplying fresh air to the passenger space of the machine and to supply heat thereto in a manner which may be regulated as desired.

With these and other objects in view, the invention consists in the device hereinafter described and particularly defined in the claims.

The various features of the invention are illustrated in the accompanying drawings, in which—

Figure 1:
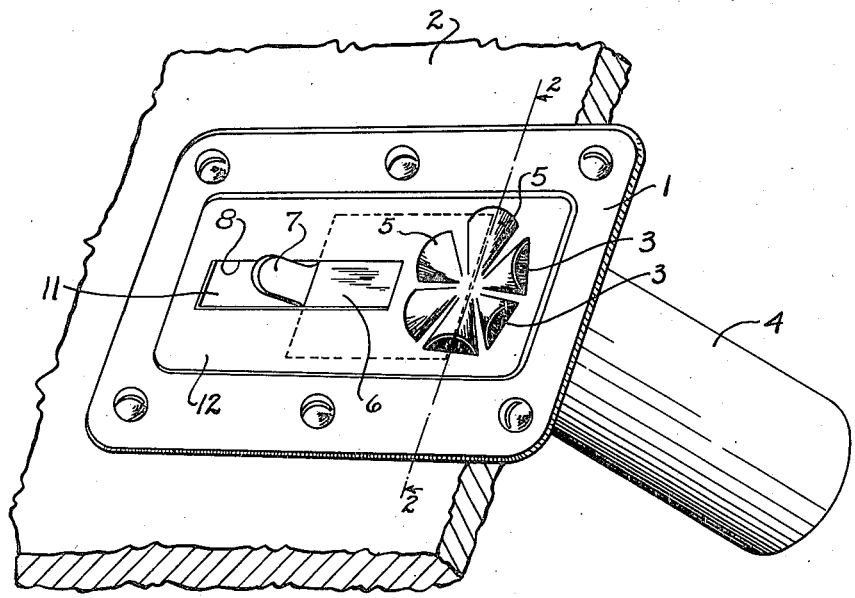
Figure 1 is a view in perspective of the preferred form of the heater valve showing the device in place in the toe board of an automobile and attached to a heated-air conducting pipe.

The preferred form of the invention comprises a valve plate 1 adapted to be fastened to or installed in the floor board or toe board 2 of an automobile. In the valve plate, preferably at one side thereof as shown in the drawings, is a circular opening or series of openings 3 through which heated air from a pipe 4 may be conducted. In order to prevent heat or heated air from being projected directly from the opening or openings 3, a covering or hood 5 is provided which serves to deflect the heating medium in a lateral direction and which serves also to improve the appearance of the device. The form of hood which I prefer comprises a series of raised fan-shaped members, as shown in the drawings, which provide a series of openings at the outer ends thereof. This form of hood may be readily made by stamping or shearing through the metal of the plate to raise portions of the metal and stretch it out of the plane of the plate, thus leaving the metal between the sheared portions intact and providing the desired amount of opening at the ends of the raised portions.

In place of the form of hood having fan-shaped members, a raised disk having legs or connecting members attached around the periphery of the opening over the pipe 4 might be employed to deflect the air therefrom in lateral directions, but I prefer the form of hood shown in the drawings because it presents a better general appearance and may be made integral with the plate by the use of a suitable punch or stamping device and is in substantially the plane of the valve plate.

Figure 2:
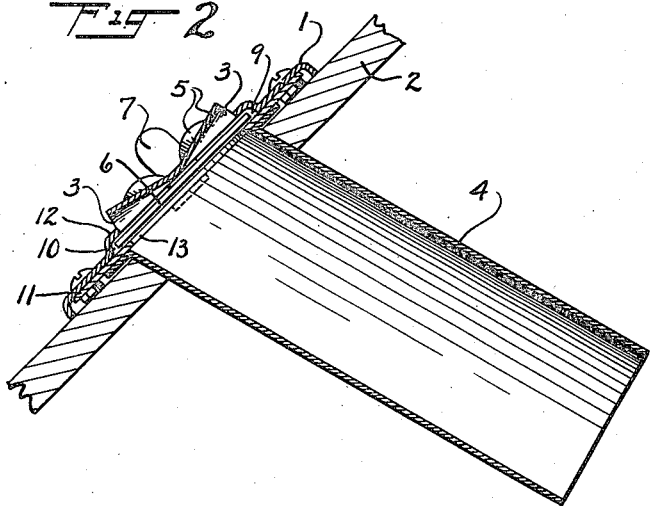
Figure 2 is a vertical section through the heater valve and heated-air conducting pipe on the line 2—2 of Fig. 1.

For the purpose of providing means whereby the size of the opening or openings leading to the pipe 4 may be varied to attain the desired heat regulation, I employ a cover plate 6, shown more particularly in Fig. 2, which is slidably mounted under the hood 5 to control communication between the pipe 4 and the openings 3. A tongue or handle 7, which projects through a slot 8 in the plate 1, is attached to the plate 6 to permit the plate to be readily placed in any desired position to cut off or permit passage of air through the valve.

Any form of construction suitable for attaining the sliding action of the cover plate over the opening 3 may be employed. A simple form of construction which I have found to be suitable comprises grooves 9 and 10 formed between a lower plate 11, and a raised portion 12 of the plate 1. In the plate 11 is an opening 13, registering with the pipe 4 and openings 3 to permit the passage of heated air when the plate 6 is moved away from the openings. The raised portion 12 of the plate 1 corresponds substantially in width with that of the cover plate 6 and is of such length as to permit the plate to slide so as to completely uncover the opening or openings 3 above the pipe 4.

In the form of the device as described, the operator may readily open the valve by sliding the plate 6, by means of the upwardly projecting tongue or handle 7 to one side so as to uncover the pipe 4, and thus open communication between the pipe and the openings 3, or the plat may be placed so as to completely cover the opening in the plate 11 over the pipe 4, so as to prevent the passage of heated air to the passenger space, or the plate may be maintained in an intermediate position so as to attain any desired amount of heating.

The heating means to which the pipe 4 is attached consists of a sheet metal jacket around the exhaust manifold within which air becomes heated and passes upwardly through the pipe 4 into the passenger-carrying space. The form of heater forms no part of the invention and is not shown therefor in the drawings.

It is to be understood that various modifications may be made in the device as described without departing from the spirit or scope of the invention, as may be apparent to one skilled in the art. It is desired, therefore, not to limit the invention to the form described, except as defined in the claims.

What I claim as new is:

1. In a heater valve for automobiles, a substantially flat plate adapted for positioning in the floor board of the passenger carrying space of an automobile, said plate being provided with an opening communicating with a heated air conducting pipe, a cover plate, means for slidably holding said cover plate to open and close said opening, means connected to said cover plate for adjusting the position thereof in said holding means in any desired position with respect to said opening to control the passage of heated air therethrough, said plate having a shield over said opening lying in close proximity to said plate to distribute heated air in lateral directions from said opening, said shield and plate lying in substantially the same plane.

2. In a heater valve for automobiles, a plate, an opening in said plate, a sliding valve in said opening, means cooperating with said sliding valve for adjusting the position thereof in said opening, and a shield over said opening comprising raised fan-shaped members having lateral openings, said shield being integral with said plate and lying in substantially the same plane therewith and adapted to distribute air circumferentially through said openings.

3. In a heating device for automobiles, the combination with a conduit for heated air leading to the compartment to be heated, of means over the discharge end of the conduit for effecting a lateral distribution of the heated air, said means having therein air-directing channels radiating from the axis of the conduit, each of said channels being in substantially the form of a section of a cone having its apex in a plane including all sections.

Signed at Detroit, Mich., this 24th day of May, 1923.

CLARENCE CARSON.